(12) United States Patent
Hosoda et al.

(10) Patent No.: US 7,524,612 B2
(45) Date of Patent: Apr. 28, 2009

(54) INFORMATION RECORDING MEDIUM AND PROCESS FOR PRODUCING THE SAME

(75) Inventors: Yasuo Hosoda, Tsurugashima (JP); Ayumi Mitsumori, Tsurugashima (JP); Megumi Sato, Tsurugashima (JP); Masataka Yamaguchi, Tsurugashima (JP); Tomoaki Izumi, Tsurugashima (JP); Satoshi Jinno, Yamanashi-ken (JP); Yoichi Okumura, Yamanashi-ken (JP)

(73) Assignee: Pioneer Corporation, Tokyo (JP)

( * ) Notice: Subject to any disclaimer, the term of this patent is extended or adjusted under 35 U.S.C. 154(b) by 756 days.

(21) Appl. No.: 10/516,244

(22) PCT Filed: May 23, 2003

(86) PCT No.: PCT/JP03/06439

§ 371 (c)(1),
(2), (4) Date: Apr. 21, 2005

(87) PCT Pub. No.: WO03/101750

PCT Pub. Date: Dec. 11, 2003

(65) Prior Publication Data

US 2005/0233247 A1    Oct. 20, 2005

(30) Foreign Application Priority Data

Jun. 3, 2002   (JP) .............................. 2002-162047
Jan. 31, 2003  (JP) .............................. 2003-024139

(51) Int. Cl.
*G11B 7/24* (2006.01)
(52) U.S. Cl. ............................. 430/270.12; 430/270.13; 430/945; 369/284
(58) Field of Classification Search ............ 430/270.12, 430/270.13, 945; 369/284
See application file for complete search history.

(56) References Cited

U.S. PATENT DOCUMENTS

| | | | | |
|---|---|---|---|---|
| 4,188,214 A * | 2/1980 | Kido et al. | ................. | 430/494 |
| 4,470,053 A * | 9/1984 | Maffitt et al. | ............. | 346/135.1 |
| 4,839,208 A | 6/1989 | Nakagawa et al. | | |
| 5,034,255 A | 7/1991 | Shigematsu et al. | | |
| 5,334,433 A | 8/1994 | Tominaga | | |
| 5,401,609 A * | 3/1995 | Haratani et al. | ........ | 430/270.12 |
| 5,972,458 A | 10/1999 | Raychaudhuri et al. | | |
| 6,251,561 B1 * | 6/2001 | Kawai et al. | ............ | 430/270.11 |
| 6,335,071 B1 * | 1/2002 | Fukano et al. | ............. | 428/64.1 |
| 6,416,837 B1 * | 7/2002 | Kojima et al. | ............. | 428/64.1 |
| 6,607,869 B1 * | 8/2003 | Kojima et al. | .......... | 430/270.13 |
| 7,381,458 B2 * | 6/2008 | Kiyono | ...................... | 428/64.1 |

FOREIGN PATENT DOCUMENTS

| | | |
|---|---|---|
| JP | 61-34741 | 2/1986 |
| JP | 62-011685 | 1/1987 |
| JP | 62-11685 | 1/1987 |
| JP | 62-114133 | 5/1987 |
| JP | 63-063153 | 3/1988 |
| JP | 63-299984 | 12/1988 |
| JP | 2-147392 | 6/1990 |
| JP | 2-165991 | 6/1990 |
| JP | 02-215587 | 8/1990 |
| JP | 2-277689 | 11/1990 |
| JP | 3-153389 | 7/1991 |
| JP | 4-121842 | 4/1992 |
| JP | 5-212967 | 8/1993 |
| JP | 10-76755 | 3/1998 |
| JP | 10-222871 | 8/1998 |
| JP | 10-329424 | 12/1998 |
| JP | 11-138996 | 5/1999 |

OTHER PUBLICATIONS

Hosoda, Yasou et al.. (2003). Inorganic Recordable Disk with more Eco-friendly Material for Blue. Japanese Journal of Applied Physics, 42, 1040-1041.*
Japanese Office Action dated Feb. 22, 2006 with English translation.
Korean Rejection Reasons dated May 24, 2006 with English translation.
European Search Report dated Jun. 2, 2005.
European Search Report Communication dated May 31, 2005.
International Search Report dated Sep. 2, 2003, with translation of relevant portions.

* cited by examiner

*Primary Examiner*—Mark F Huff
*Assistant Examiner*—Anna L Verderame
(74) *Attorney, Agent, or Firm*—McGinn IP Law Group, PLLC

(57) ABSTRACT

An information recording medium has an excellent jitter characteristic with a considerable difference in reflectance between prior to and subsequent to recording. The information recording medium includes a recording layer which contains a material having a reflectance which varies by irradiation of a light beam, on which information is recorded as reflectance variations, and a substrate for supporting the recording layer, the recording layer including a metal nitride as a major component. In a method of manufacturing the information recording medium having a recording layer which includes a material having a reflectance which varies by irradiation of a light beam, on which information is recorded as reflectance variations, and the substrate for supporting the recording layer, the recording layer including a metal nitride as a major component, the method includes a recording layer forming step for forming the recording layer by a reactive sputtering method which uses a target comprised of a metal constituting a metal nitride, wherein a flow ratio Ar:$N_2$ in an atmosphere including Ar and $N_2$ in the recording layer forming step is set within the range of 80:10 to 10:80.

14 Claims, 7 Drawing Sheets

US 7,524,612 B2

INFORMATION RECORDING MEDIUM AND PROCESS FOR PRODUCING THE SAME

TECHNICAL FIELD

The present invention relates to an optical information recording medium such as an optical disc, an optical card and the like for recording/reproducing information by irradiating a light beam, and a method of manufacturing the same.

BACKGROUND ART

In recent years, a DVD (Digital Versatile Disc) is widely used as an information recording medium for recording/reproducing data, such as video data, audio data, computer data, and the like. The DVD comes in different types: in addition to the DVD used exclusively for reproduction, the DVD-R (recordable) which uses an organic coloring material in the recording layer thereof to allow writing-once-reading-many, the DVD-RW (re-recordable) which uses a phase change material in the recording layer thereof to allow rewriting many times, and the like.

While there is a demand for a capability of recording/reproducing by light beams of wave range shorter than 635 nm so as to cope with higher density, the conventional write-once-read-many optical disc has been unable to fully realize characteristics of the optical disc.

In addition, various optical discs of write-once type are reported, for example, one of which has a recording layer to be penetrated by the irradiation of a laser beam to have a hole, in another of which a bubble cavity in a recording layer is formed by the irradiation of a laser beam, another of which has a recording layer to have a protuberance, in further another of which a heat decomposable substance is dispersed in the recording layer by the irradiation of a laser beam. These conventional recording methods have a problem in that it is difficult to control the size and edge of a minute recorded mark formed on the recording layer with a high density recording. In other words, as shown in FIG. 16, the recorded mark is formed so as to spread out a guide groove during the recording.

Further, in the case of the write-once-read-many disc, rewriting is not allowed on an area once recorded. This increases consumption of the discs. The effects on the environment due to the dumping of the discs should be considered, because some discs may contain materials which are considered to be deleterious under "a law concerning promotion of improvements in grasp of the amount of a specific chemical material discharged to the environment, and in the control thereof or the like", i.e., PRTR (Pollutant Release and Transfer Register) law.

DISCLOSURE OF THE INVENTION

It is an object of the present invention to provide an information recording medium which has a considerable difference in reflectance between prior to and subsequent to recording, and is excellent in reproduction property such as a jitter characteristic or the like.

The information recording medium according to the present invention is characterized by comprising a recording layer which includes a material having a reflectance varying by irradiation of a light beam and on which information is recorded as reflectance variations, and a substrate for supporting the recording layer, wherein the recording layer includes a metal nitride.

The information recording medium according to the present invention is characterized in that said recording layer of the information recording medium includes a mixture of both a low temperature decomposable nitride insufficiently nitrided and capable of being decomposed at a predetermined temperature to generate nitrogen and a high temperature decomposable compound capable of being decomposed at a temperature higher than said predetermined temperature.

A method of manufacturing an information recording medium according to the present invention is directed to a manufacturing an information recording medium having a recording layer which includes a material having a reflectance varying by irradiation of a light beam, on which information is recorded as reflectance variations, and a substrate for supporting said recording layer, the recording layer including a metal nitride as a major component, the method comprising: a recording layer forming step for forming said recording layer by a reactive sputtering method using a target comprised of a metal constituting said metal nitride, characterized in that a flow ratio $Ar:N_2$ in an atmosphere including Ar and $N_2$ in said recording layer forming step is set within the range of 80:10 to 10:80.

BRIEF DESCRIPTION OF THE DRAWINGS

FIG. 12 is a graph showing variations in the percentage of contents of Ge, a nitride, and an oxide thereof with respect to a dose of nitrogen in the recording layer of the example.

FIG. 13 is a graph showing variations in the percentage of contents of Bi, a nitride, and an oxide thereof with respect to a dose of nitrogen in the recording layer of the example.

DETAILED DESCRIPTION OF THE INVENTION

Exemplary embodiments according to the present invention will be described with reference to the drawings.

Figure 1:
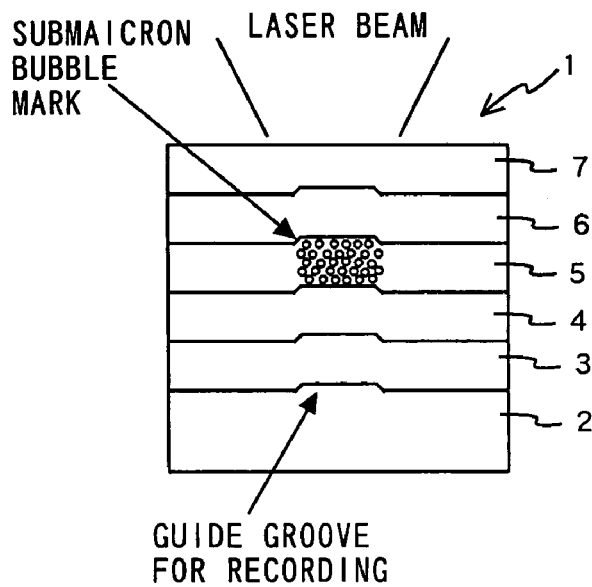
FIG. 1 is a partial cross sectional view schematically illustrating an information recording medium according to the present invention.
Figure 2:
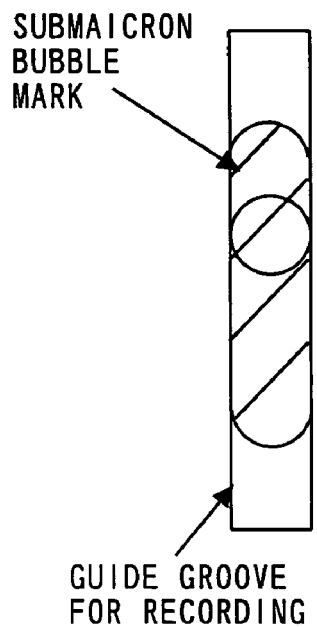
FIG. 2 is a partial plan view schematically illustrating an information recording medium according to the present invention.

An exemplary configuration of an embodiment is shown in FIG. 1. An information recording medium 1 has a reflecting layer 3, a first dielectric layer 4, a recording layer 5 comprised essentially of a metal nitride as a major component, a second dielectric layer 6, and a light transparent covering layer 7 which are sequentially deposited on a main surface of a substrate 2. As shown in the figure, during recording, laser beams, which are intensity-modulated in accordance with information, are irradiated through the light transparent covering layer 7 to heat the recording layer 5. Since the recording layer includes the metal nitride as a major component and has a low thermal conductivity, the temperature of a laser beam irradiating portion rises due to thermal storage, the recording layer entirely or partly melts, the nitrogen content in the entire recording layer changes, a phase changes followed by changes in multiple reflection conditions of the irradiating portion during solidification, and a reflectance changes to become a recording mark, as shown in FIG. 2. Therefore, it is conceivable that the percentage of nitride formed in the recording layer, which varies according to the nitrogen content, affects sensitivity. The variations in light reflectance occurring in this manner is irreversible, so that the recording layer can be used as a once-write-read-many type information medium. Upon reproduction, laser beams are irradiated to an area where the reflectance varied through the light transparent covering layer 7 to read an intensity variation in the reflective light and demodulate the read information.

The recording layer 5 may also comprise metal nitrides with a combination of, for example, one of Bi, Sn, Fe, and one of Ge, Ti, Si, Al. Further, while the aforementioned metal nitride is not designated under the PRTR law, it may also comprise, for example, a combination of any of Bi, Sn, Fe, and materials such as Mg, Ca, Sr, Sc, Y, Zr, Hf, V, Nb, Tc, Ru, Rh, W, Re, Os, Ir, Pt, Au, Ta, and the like. Effects on environment can be reduced by using materials which are not designated by the PRTR law for the recording material. When consideration is given to a method and an amount to be used, Ti, Te, In, Cu, Zn, or Ag can be used for composition of the metal nitride of the recording layer 5.

In addition, the recording layer 5 may be constituted by a substance selected from a group consisting of a metal nitride, a metal oxide, a metal carbide and a mixture of at least two thereof, e.g., one of Bi nitride, Sn nitride, Fe nitride, or Cu nitride, and a stable metal compound such as $SiO_2$, $Al_2O_3$, $GeO_2$, $SnO$, $Bi_2O_3$, $SiC$ or the like.

Principle of Recording

Figure 16:
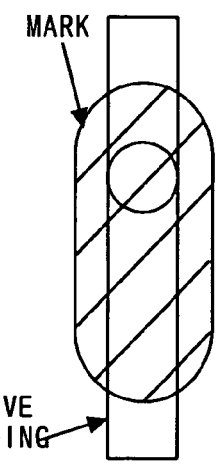
FIG. 16 is a partial cross sectional view schematically illustrating a conventional information recording medium according to the present invention.

The recording layer of the recording medium includes a metal compound and nitride thereof as a major component in a homogeneously dispersed phase alloy form. By the laser beam irradiation in a recording process, nitrogen is emitted from nitride in the recording layer. For this, it is necessary for the recording layer to absorb the laser beam and thus, the nitride has to be provided with a certain absorption rate. It is therefore required that the nitride of the recording layer has a non-nitrided component, but not wholly nitrided to have a high transmissivity. On the other hand, since the recording layer made of the nitride insufficiently nitrided has a membranaceous quality similar to a thin amorphous metal film, its stiffness and stress become low and its thermal conductivity increases. In the nitride layer insufficiently nitrided, temperature rise is hard due to transverse dispersion of heat during heating. Moreover, since the thermal decomposition of nitrogen is expanded like a chain reaction, as a result, there occurs that for example the recording light spot makes a large mark greater than the light spot itself, as shown in FIG. 16. This phenomenon raises a problem of difficulty in control over the size and edge shape of mark to be recorded on the recording layer by the laser beam irradiation of purplish blue band. Particularly the recorded large mark is a serious problem to form a minute size mark having a width of 0.1-0.2 μm, though it is out of problem in CD case.

In the embodiment, the recording layer is constituted by a mixture of both a substance having a high stiffness and the difficult thermal decomposition characteristic and a nitride having the easy thermal decomposition characteristic. This mixture recording layer facilitates to control the thermal decomposition itself and to form the minute mark having a good shape. Besides, in order to record information by variations of optical characteristics, the substance having the difficult thermal decomposition characteristic is selected from materials having a high transmittance. Concretely the recording layer includes a low temperature decomposable nitride (nitrogen emission substance), a non-nitride (non-nitrided component in the nitride i.e., thermal absorber), and a high temperature decomposable compound (metal nitride or metal oxide or metal carbide or the mixture thereof i.e., thermal decomposition controller substance). In fact, the non-nitride will be realized as a non-nitrided component in the nitride composition constituting the recording layer. Therefore, the mixture of both the low temperature decomposable nitride having the non-nitrided component and the high temperature decomposable compound suffice for the recording layer of the recording medium.

The principle of recording information to the optical disc employing such recording layer is considered as follows.

First, when the recording laser beam is irradiated onto the optical disc, the thermal absorber i.e., non-nitrided component in the nitride of the recording layer exhibit temperature raise in the beam spot. Next, the low temperature decomposable nitride is decomposed to emit nitrogen. Next, (1) the optical characteristic of the recording layer changes due to the nitrogen emission. Next, (2) the recording layer is deformed by the emitted nitrogen. Here, (2) is only of secondary recording mode. The deformation of the recording layer does not mainly contribute to the recording. The separation of nitrogen is likely to be hindered when the recording layer is suppressed with a storing pressure. Thus, the deformation of the recording layer should be allowed to a certain extent. The dielectric layer has a first role of buffering layer for the deformation of the recording layer when nitrogen comes out from the recording layer, a second role of adjusting layer for the optical characteristic, and a third role of thermal insulation against the effect of the metal reflecting layer radiating heat. The reflecting layer has functions both of the heat radiation and the enhancement of multiple-reflection for ensuring quantity of light. Thus the reflecting layer is not always provided.

In the optical disc, it is estimated that the irradiation of the recording laser beam makes temperature raise of the recording layer 400 to 600° C. at the maximum. Therefore, the low temperature decomposable nitride and the high temperature decomposable compound should be selected on the basis of a threshold temperature approximately 600° C., for example, in comparison with temperature of decomposition for materials. Table 1 shows the decomposition temperatures of the various metal nitrides.

TABLE 1

| Metal nitrides | Decomposition temperatures (ca. ° C.) |
|---|---|
| AgN | 25 |
| $Na_3N$ | 200 |
| BiN | 220 |
| $Cu_3N$ | 300 |
| $Fe_2N$ | 350 |
| SnN | 380 |
| GeN | 600 or more |
| GaN | 1500 |
| CrN | 1600 |
| $Si_3N_4$ | 1900 |
| AlN | 2000 |
| VN | 2200 |
| BN | 2700 |
| TiN | 3300 |

Low Temperature Decomposable Nitride

It is necessary for the low temperature decomposable nitride to exhibit the separation reaction of nitrogen at a low temperature of 600° C. or less. Further, it is considered that the separation reaction of nitrogen preferably begins at a temperature of 400° C. or less on the basis of recording sensitivity. However, a substance exhibiting the separation of nitrogen at 80° C. or less should not employed for fear of an influence to preservation characteristic of the recording layer at a too low temperature. Thus, the threshold temperature is 100° C. or more preferable for the low temperature decomposable nitride. In addition, if the environment is considered, then the selection of layer component is preformed except materials specified under the PRTR Low. The inventors have investigated the selection conditions of the substance in addition to sputterable material and then directed the attention to the nitride constituted by metals having comparatively low melting point such as Bi, Sn or the like as prospective low temperature decomposable nitrides. If the PRTR Low is not considered then materials such as Cu or the like are usable for the component of the low temperature decomposable nitride.

Figure 3:
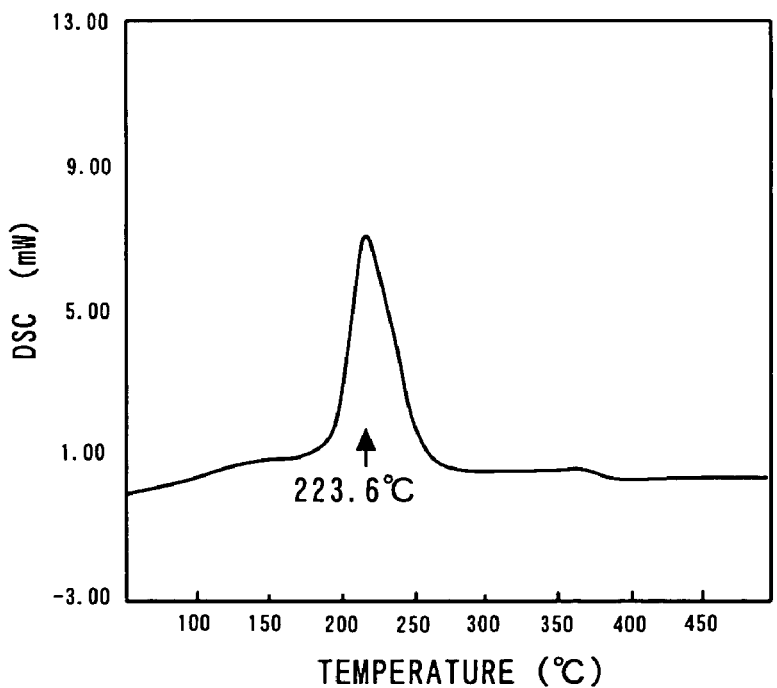
FIG. 3 is a graph showing a curve of differential scanning calorimetry performed on a BiN recording layer of information recording medium.

The inventors have formed a film of BiN (recording layer) and analyzed the film with a differential scanning calorimetry. The BiN film has decomposed at approximately 220° C. as shown in FIG. 3. Further, the BiN film has exhibited a starting temperature of practice decomposing, approximately 180° C. which is lower than its decomposition temperature by 50-70° C. It is considered in view of the allowable margin of error that the decomposition of BiN starts a temperature lower than its decomposition temperature by 50-100° C. The inventors have formed optical discs having recording layers constituted by low temperature decomposable nitrides such as BiN, SnN and the like respectively and then evaluated them. As a result, it comes to a conclusion that BiN is superior to SnN as the low temperature decomposable nitride. However, the selection of SnN doesn't matter.

Figure 4:
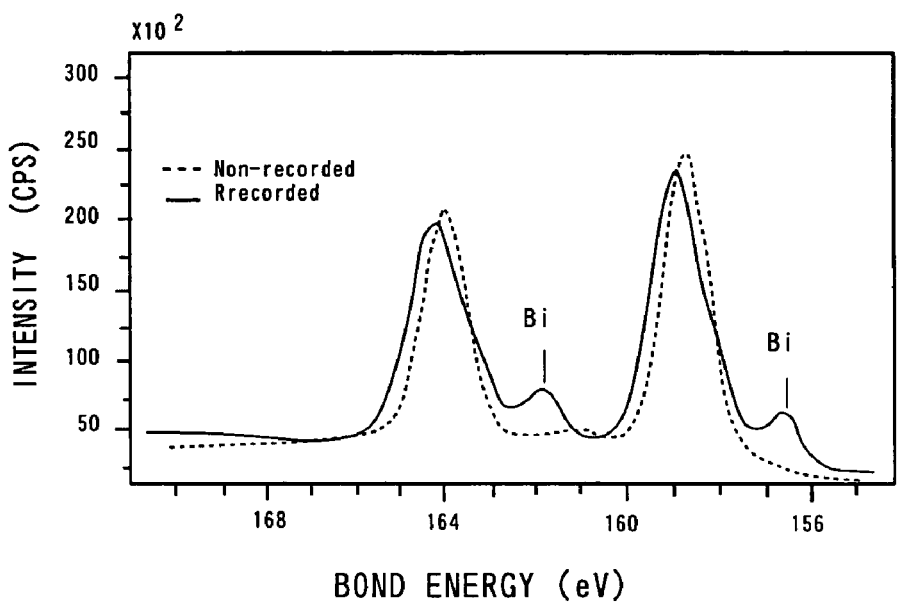
FIG. 4 is a graph showing a spectral characteristic curves of ESCA analysis performed on a BiN recording layer of information recording medium before and after recording data.

FIG. 4 shows spectral characteristics curves of the recording layer employing BiN as a low temperature decomposable nitride resulting from ESCA (Electron Spectroscopy for Chemical Analysis or X-ray Photoelectron Spectroscopy). In these spectral characteristics curves, since peaks of Bi metal appear after recording but not at the non-recording portion, it is evidence that BiN decompose to nitrogen and bismuth.

High Temperature Decomposable Compound

The high temperature decomposable compound is stable at a temperature of 600° C. or less and has a high transmissivity in the reading light beam irradiated to the optical disc and a high hardness to support the layer shape itself. Prospective metal compounds include metal nitride, metal oxide, metal carbide and the like as well as the mixture of at lest two thereof. In addition, the inventors have preformed the selection of layer component under the conditions of simultaneously sputterable material with the low temperature decomposable nitride while considering the environment except materials specified under the PRTR Low. As a result, the metal nitride stable at a high temperature, GeN, SiN, AlN, and TiN are prefable.

The inventors have analyzed GeN, SiN, AlN, and TiN with the differential scanning calorimetry and then recognized that no decomposing reaction of GeN occur at 500° C. The inventors have formed optical discs having recording layers constituted by these high temperature decomposable nitrides respectively and then evaluated them. As a result, it comes to a conclusion that optical discs GeN>TiN>SiN>AlN are superior in this order on stableness. The use of GeN or TiN is preferable in optical characteristics. In addition to the nitride, the stable metal compound at a high temperature includes stable metal oxides such as $SiO_2$, $Al_2O_3$, $GeO_2$, SnO, $Bi_2O_3$ and the like, and stable metal carbides such as SiC and the like, as well as the mixture thereof. Generally almost oxides have high thermal stableness, some of which exhibit glass transition at a high temperature. Also, SiC in carbides has a high thermal stableness and no melting under the atmospheric pressure.

Table 2 shows melting points of oxides and carbide instead of decomposition temperatures, because the decomposition temperature melting point is higher than the melting point. Here, the sublimating point is shown when the sublimating point is lower than the melting point.

TABLE 2

| Oxides or carbide | Melting points (or sublimating point: SP) (° C.) |
|---|---|
| $SiO_2$ | 1710 |
| $Al_2O_3$ | 1990 or more |
| $GeO_2$ | 1116 |
| $SnO_2$ | 1127 |
| $Bi_2O_3$ | 820 |
| $TiO_2$ | 1640 |
| TiO | 1750 |
| ZnO | 1725(SP) |
| $Cr_2O_3$ | 1990 |
| CoO | 1935 |
| $ZrO_2$ | 2700 |
| FeO | 1370 |
| CuO | 1026 |
| NiO | 1998 |
| BaO | 1923 |
| MnO | 1650 |
| MgO | 2880 |
| SiC | 2200 or more(SP) |

Film Deposition Method

While the recording layer 5 of metal nitride can be deposited by various vapor deposition methods, it is preferably formed by a reactive sputtering method, and particularly it is preferably formed by the reactive sputtering method in an atmosphere including Ar and $N_2$ using a metal alloy target. This film forming process is preferable because the recording layer can be homogeneously formed at once. Besides, co-sputtering can be used for the process in which deposition simultaneously is performed using a plurality of targets or divided targets. In the reactive sputtering method, a flow ratio $Ar:N_2$ in a sputtering atmosphere preferably ranges from 80:10 to 10:80, and more preferably from 80:10 to 30:60. Namely, nitrogen is added so enough for the recording layer to have a satisfactory sensitivity and a jitter characteristic after recording, with a value in the range of amount to be added for sputter atmosphere flow ratio $Ar:N_2=80:10$ to 0:100. Moreover, nitrogen is added so enough for the recording layer to have absorption in a violaceous laser beam having a wavelength of the vicinity of 400 nm, with a value in the range of amount to be added for sputtering atmosphere flow ratio $Ar: N_2=30:60$ to 100:0. Further, due to reactive sputtering, the deposition rate tends to slow down as the amount of nitrogen gas introduced increases. Therefore, due to a requirement to simplify the fabrication, it is desirable that the deposition rate is in the range of 2 nm/min or more (sputtering atmosphere flow ratio is $Ar:N_2=10:80$ to 100:0). It is conceivable that an amorphous metal nitride is mixed in the recording layer formed in this manner.

Figure 5:
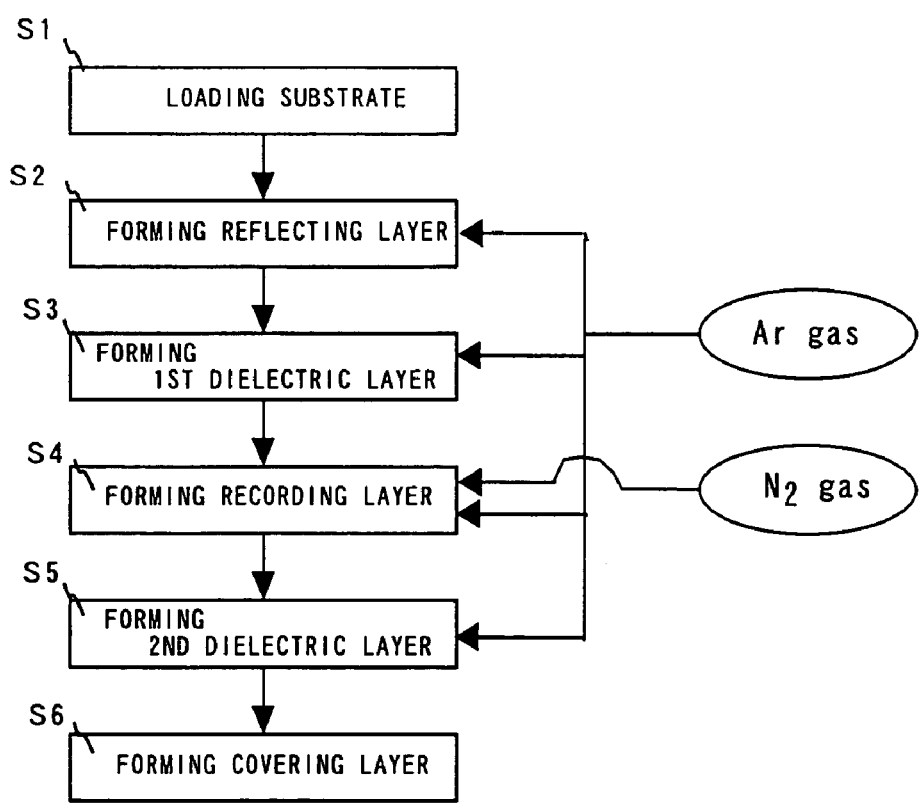
FIG. 5 is a flow chart showing a method of manufacturing the information recording medium according to the present invention.

A method of manufacturing the information recording medium of the embodiment includes, as shown in FIG. 5, a step S1 for loading a substrate on a sputtering device, and a recording layer forming step S4 for forming the recording layer by a reactive sputtering method using an alloy target comprising metal constituting a metal nitride, wherein the flow ratio $Ar:N_2$ in atmosphere including Ar and $N_2$ in the recording layer forming step is set to be within the range of 80:10 to 10:80. Moreover, when forming the reflecting layer, the following procedure is preformed in the order as shown in FIG. 5. After the substrate loading step S1, a reflecting layer is formed through the sputtering in an Ar gas atmosphere executed using a predetermined target (reflecting layer forming step S2). And then a first dielectric layer is formed through the sputtering in an Ar gas atmosphere executed using another predetermined target (first dielectric layer forming step S3). After the recording layer S4 (Ar and $N_2$ atmosphere), a second dielectric layer is formed through the sputtering in an Ar gas atmosphere executed using another predetermined target (second dielectric layer forming step S5). Lastly, a covering layer is formed (S6).

The recording layer 5 comprising the nitride composed of one or more elements of Bi, Sn, and either of the elements Ge, Ti, Si and Al for example, GeBiN, is capable of absorbing 10% or more of light in the vicinity of wavelength 405 nm at an unrecorded portion. The recording layer 5 can achieve such an absorption rate even in a short wave length area of, for example, 385 to 450 nm, thus making it possible to cope with high density recording using a short wave length laser light. Recording using violaceous laser can be performed with less recording energy by containing a metal nitride in the recording layer. In addition, since the reactive sputtering allows control of the percentage of nitrogen in the metal nitride to change the absorption rate of the recording layer, the degree of freedom in designing of the medium is increased, a high reflectance and a suitable recording sensitivity are provided, and at the same time a high modulation degree, a low jitter, and a low cross talk can be implemented.

It should be noted that inert gas such as Xe, Kr other than Ar can be added in the sputtering atmosphere. In addition, the metal used as a target may be replaced by an off-stoichiometry material. Further, the use of the metal nitride target allows forming the above recording layer by using only Ar without $N_2$ gas.

While the thickness of the recording layer is determined as appropriate depending on the physical property of the recording layer, the physical property and thickness of the dielectric layer, it has been confirmed that a jitter can be removed sufficiently in case of the thickness being 5 to 40 nm, preferably 10 to 30 nm, for example 12 nm. If the thickness of the recording layer is thinner than 5 nm, it becomes difficult to enlarge the degree of modulation. If it is thicker than 40 nm, reflectance becomes insufficient due to light absorption by the recording layer.

Configurations other than the recording layer 5 of the embodiment shown in FIG. 1 will be described below in detail.

Substrate 2

For a substrate 2, glass or plastic resin such as an acrylic resin, a polycarbonate resin, an epoxy resin, a polyolefin resin, or the like, is used. Further, an ultraviolet curing resin or the like is coated and hardened on a flat plate by a spin-coat method. Alternatively a sheet material of plastic resin is adhered together by an adhesive is also used.

While the substrate 2 is not particularly limited in dimension and shape thereof, it is in the form of disc and generally has a thickness of about 0.3 to 1.2 mm. A predetermined pattern such as a groove or the like can be provided on the substrate 2 as appropriate so as to guide a light beam for recording/reproduction such as for tracking, address, or the like. The light beam for recording/reproduction is usually irradiated within the groove. A groove can be provided on either or both of a light incident side and a light reflecting side of the substrate. Deposition can be performed from either side, the light incident or reflecting side. The substrate 2 may also be a card-form recording medium in addition to the disc shape.

Dielectric layers 4 and 6

Dielectric layers 4, 6 are made of one or more of dielectrics, for example, an oxide, a nitride, or a sulfide of $SiO_2$, $SiN_X$, ZnS, or the like, or a metallic compound such as various kinds of a metallic oxide, and a metallic carbide, and a mixture thereof, e.g., $ZnS$—$SiO_2$, but are not limited to them in particular. Alternatively, with respect to a so-called LaSiON which contains La, Si, O, and N, and a so-called SiAlON dielectric which contains Si, Al, O, and N, only a combination of materials which are not designated under the PRTR law can be selected. The dielectric layer may comprise a plurality of layers.

The second dielectric layer on the light incident side is provided in a thickness of 0 to 100 nm for adjusting an optical reflectance and for adjusting a recording mode to a desired specification, high to low, or low to high.

The first dielectric layer on a light reflecting side functions to temporarily store heat generated by a laser light before it escapes to the reflecting layer to heat the recording layer sufficiently. The thickness of the dielectric layer is 40 nm or less, preferably 10 to 30 nm.

Reflecting Layer 3

A reflecting layer 3 preferably mainly includes a metal or an alloy having a high reflectance, and the metal may be one selected from, for example, Ag, Al, Au, Pt, Cu, or the like, and the alloy may be one including at least one of them or the like, as appropriate.

The thickness of the reflecting layer 3 is preferably 30 to 150 nm. If the thickness is below the range, it becomes difficult to acquire a sufficient reflectance. In addition, a thickness exceeding the range provides only a little improvement in reflectance and is disadvantageous in terms of cost. The reflecting layer 3 is preferably formed by a vapor phase epitaxy method, such as a sputtering method, a vapor deposition method, or the like.

Moreover, a semitransparent film may be used for the reflecting layer. The semitransparent reflecting layer can be adapted to a multilayer write-once optical disc having a multilayered structure of recording layers so as to be disposed at a near side of the optical pickup. The lamination order without the reflecting layer is Substrate/Dielectric layer/Recording layer/Dielectric layer/Covering layer.

Light Transparent Covering Layer 7

In an information recording medium 1, a light for recording and a light for reproduction are irradiated to the recording layer 5 through a light transparent covering layer 7. Therefore, the light transparent covering layer 7 must be substantially transparent relative to the lights. Further, the light transparent covering layer 7 is provided so as to increase a mar resistance and a corrosion resistance, and preferably includes a variety of organic materials. In particular, it can comprise materials made by hardening a radiation curing type compound or a constituent thereof by radiation such as an electron beam, an ultraviolet ray, or the like.

The thickness of the light transparent covering layer 7 is usually approximately 0.1 to 600 mm, and may be formed by an ordinal method such as spin deposition, gravure deposition, spray deposition, dipping, and the like. Specifically, a variety of resins such as an acrylic resin, a polycarbonate resin, an epoxy resin, a polyolefin resin, and the like may be used. Moreover, a plastic resin sheet may be used as a covering layer so as to be adhered with a pertinent adhesive to the dielectric layer.

Layer Structure

In the foregoing, a case where the present invention is applied to a single-sided recording type information recording medium has been described, and the present invention is also applicable to a double-sided recording type information recording medium. Further, the one-sided recording type can also be configured to comprise a protective layer which is adhered onto the light transparent covering layer 7. In this manner, the layer structure of the recording medium is applicable as well as to the above composition and combination of the recording layer, to a variety of configurations, should they only meet the requirements of the present invention. There are many configurations such as a configuration having no light transparent covering layer, a configuration having a layer of another material added other than a dielectric layer, a recording layer, and a reflecting layer, a configuration in which a recording layer further includes multilayers, a configuration having no reflecting layer, a configuration having two reflecting layers, a configuration having no light reflecting side substrate, a configuration having one or more recording medium configurations added at the positions of a light incident side substrate and a light reflecting side substrate to allow multilayer recording, and the like.

Examples of the present invention will be given and described in detail in the following.

EXAMPLE 1

A reflecting layer 3, a first dielectric layer 4, a recording layer 5, a second dielectric layer 6, and a light transparent covering layer 7 were formed in turn on the surface of a substrate 2 to make a sample of an optical disc as Example 1 which has a configuration shown in FIG. 1.

As a light reflecting side substrate, there was used a substrate having a thickness of 1.1 mm and a diameter of 12 cm made of polycarbonate resin on which a spiral groove having a 27 nm depth and a pitch of 0.320 mm was provided.

A reflecting layer of Ag—Pd—Cu alloy having a thickness of 100 nm, and a first dielectric layer of ZnS—SiO$_2$ having a thickness of 10 nm were sequentially deposited on the substrate by a sputtering method.

Subsequently, a recording layer having a thickness of 12 nm was deposited in an atmosphere of 10 sccm of N$_2$ gas with respect to 80 sccm of Ar gas by a reactive sputtering method using a Bi—Ge target. The condition during reactive sputtering is, for example, that a distance between substrate targets is 120 mm, atmosphere pressure is 0.4 to 0.8 Pa, and power is 150 W in an RF magnetron sputtering apparatus.

Subsequently, a second dielectric layer of ZnS—SiO$_2$ (light incident side) having a thickness of 40 nm was further deposited by the sputtering method.

In addition, a polycarbonate resin sheet was adhered onto the second dielectric layer at the incident side using an ultraviolet curing resin to be a 0.1 mm thick covering layer to protect the recording layer. In this way, a recording medium of Example was obtained.

A random pattern of 1-7 modulation was recorded on the produced sample using a multipath record at a linear velocity of 5.3 m/s with recording laser power of 5.3 mW and window width of 15.15 nsec, using an optical head having an objective lens with a numerical aperture (NA) of 0.85 and a light source at wavelength of 405 nm. When a jitter after recording is measured, a jitter of about 9.8% was obtained.

EXAMPLE 2

An optical disc of Example 2 was formed in the same manner as Example 1 except that a recording layer was subjected to reactive sputtering and deposited in an atmosphere of 20 sccm of N$_2$ gas with respect to 70 sccm of Ar gas to provide the second dielectric layer of ZnS—SiO$_2$ having a thickness of 25 nm at the light incident side.

When a random pattern was recorded, and a jitter after recording was measured in the same manner as Example 1 except that a recording laser power of 5.0 mW was used in this Example, a satisfactory jitter of about 7.5% was obtained.

EXAMPLE 3

An optical disc of Example 3 was formed in the same manner as Example 1 except that a recording layer was subjected to reactive sputtering and deposited in an atmosphere of 40 sccm of N$_2$ gas with respect to 50 sccm of Ar gas to provide the second dielectric layer of ZnS—SiO$_2$ having a thickness of 20 nm.

When a random pattern was recorded, and a jitter after recording was measured in the same manner as Example 1 except that a recording laser power was 5.0 mW in this Example, a satisfactory jitter of about 7.3% was obtained.

EXAMPLE 4

An optical disc of Example 4 was formed in the same manner as Example 1 except that a recording layer was subjected to reactive sputtering and deposited in an atmosphere of 70 sccm of N$_2$ gas with respect to 20 sccm of Ar gas to provide the second dielectric layer of ZnS—SiO$_2$ having a thickness of 15 nm.

When a random pattern was recorded, and a jitter after recording was measured in the same manner as Example 1 except that a recording laser power was 5.7 mW in this Example, a satisfactory jitter of about 7.4% was obtained.

When a random pattern was recorded, and a jitter after recording was measured in the same manner as Example 1 except that a recording laser power was 8.6 mW in this Example, a satisfactory jitter of about 9.2% was obtained.

COMPARATIVE EXAMPLE 1

An optical disc of Comparative example 1 was formed in the same manner as Example 1 except that a BiGe recording layer having a thickness of 25 nm was deposited by sputtering in an atmosphere which was added with no nitrogen but Ar gas only to provide the first and second dielectric layers of ZnS—SiO$_2$ having thicknesses of 40 nm and 20 nm at the light reflecting and incident sides respectively.

When a random pattern was recorded, and a jitter after recording was measured in the same manner as Example 1 except that a recording laser power was 5.0 mW in this Example, the result was an immeasurable level of 20% or more.

COMPARATIVE EXAMPLE 2

An optical disc of Comparative example 2 was formed in the same manner as Example 1 except that a reflecting layer was not deposited, and sputtered in an atmosphere which was added with no nitrogen but with Ar gas only to deposit a BiGe recording layer having a thickness of 30 nm by employing the first and second dielectric layers of ZnS—SiO$_2$ having thicknesses of 35 nm and 30 nm at the light reflecting and incident sides, respectively.

When a random pattern was recorded, and a jitter after recording was measured in the same manner as Example 1 except that a recording laser power was 5.0 mW in this Example, a jitter of about 16% was obtained.

CONCLUSION

Figure 6:
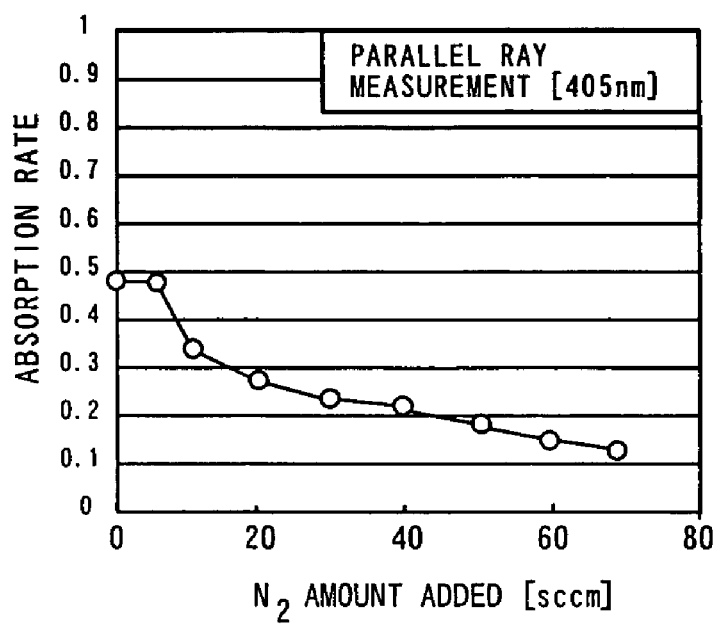
FIG. 6 is a graph showing variations in absorption rate of 405 nm wavelength light in a recording layer of an example.
Figure 7:
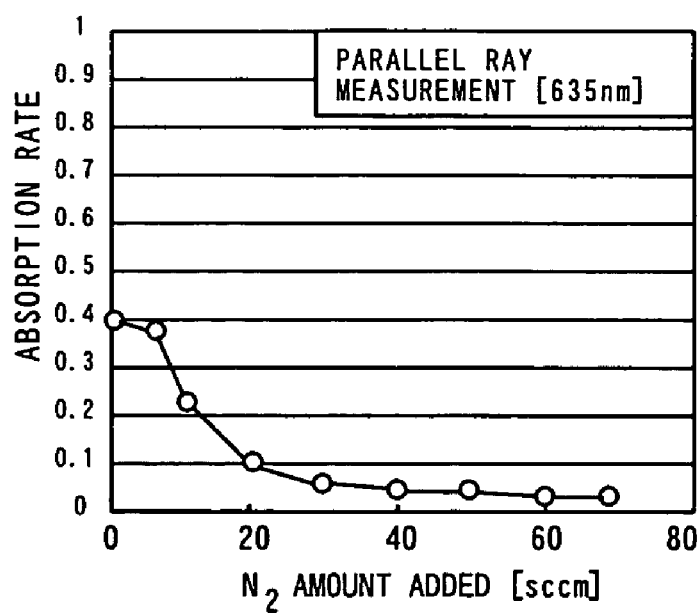
FIG. 7 is a graph showing variations in absorption rate of 635 nm wavelength light in the recording layer of the example.
Figure 8:
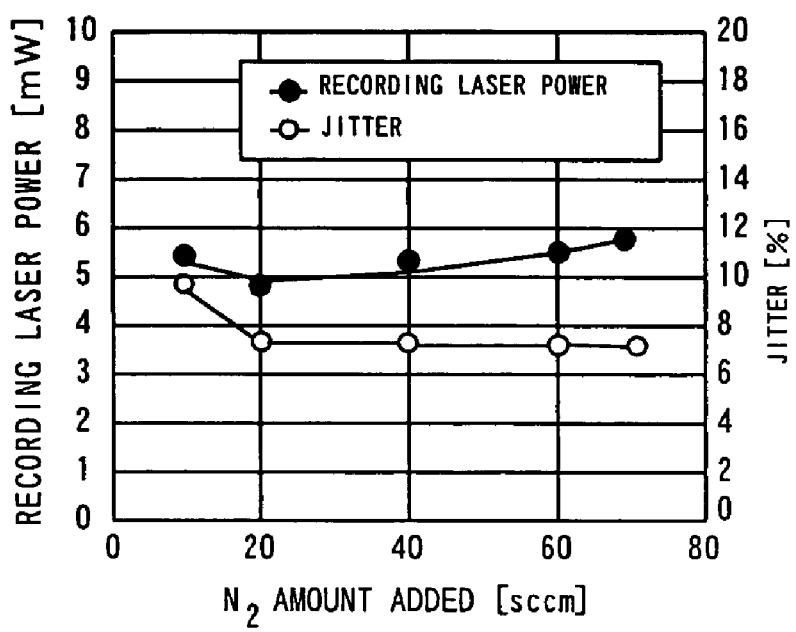
FIG. 8 is a graph showing variations in a recording laser power and a jitter after recording with respect to a dose of nitrogen in the recording layer of the example.
Figure 9:
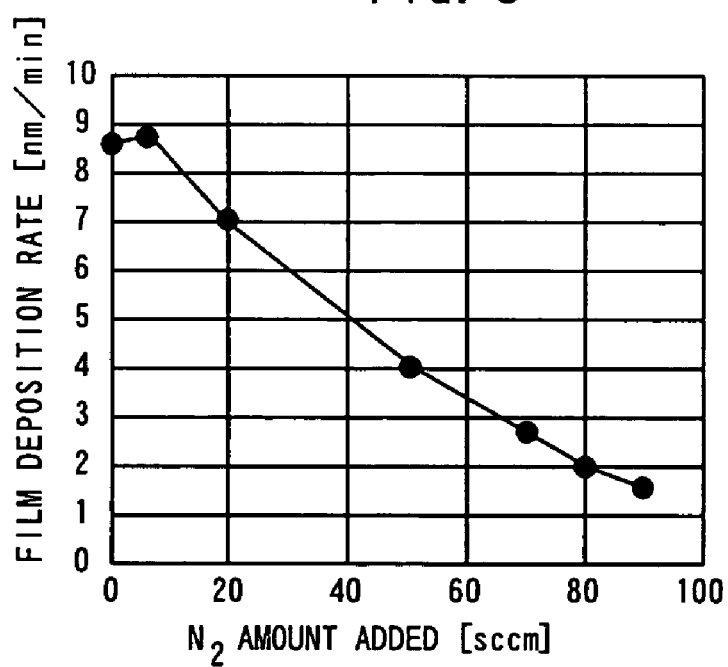
FIG. 9 is a graph showing variations in a deposition rate with respect to a dose of nitrogen in the recording layer of the example.

Measurement results acquired from the samples are shown in figures. FIGS. 6 and 7 show variations in absorption rate of 405 nm wavelength and 635 nm wavelength lights on a recording layer of the samples respectively (measured while sealed by a ZnS—SiO$_2$ film). FIG. 8 shows variations in recording laser power and jitter after recording on the recording layer of the sample with respect to the amount of nitrogen added. FIG. 9 shows variations in deposition rate on the recording layer of Example with respect to the amount of nitrogen added.

It can be seen from FIG. 6 that the recording layer comprising a GeBi nitride can secure the absorption rate of 10% or more of the light in the vicinity of 405 nm in the unrecorded portion thereof.

It can be seen from FIG. 7 that addition of nitrogen greatly reduces the absorption rate of the light in the vicinity of 635 nm of the recording layer and recording sensitivity, thereby addition of nitrogen to an information recording medium which uses 635 nm wavelength light for recording/reproduction is limited to only a very small amount due to the restriction of the recording sensitivity.

It can be seen from FIG. 8 that the addition of nitrogen in reactive sputtering must be preferably added such that the recording layer has a satisfactory sensitivity and a jitter characteristic after recording (a sputtering atmosphere flow ratio is Ar:N$_2$=80:10 to 0:100), and is within the range in which a sufficient absorption is secured with a violaceous laser in the vicinity of 400 nm (a sputtering atmosphere flow ratio is Ar:N$_2$=30:60 to 100:0).

It can be seen from FIG. 9 that a deposition rate slows down with an increase in the amount introduced of nitrogen gas due to reactive sputtering, and the range in which the deposition rate is 2 nm/min or more in view of necessity of easy fabrication is when a sputtering atmosphere flow ratio is Ar:N$_2$=10:80 to 100:0.

Further Embodiments A-C

Similarly to the above embodiments, there were layered on substrate of polycarbonate resin by the sputtering and reactive sputtering, the alloy reflecting layer of Ag, the first dielectric layer of ZnS—SiO$_2$, the recording layer, the second dielectric layer of ZnS—SiO$_2$ in this order. The recording layer was formed through the reactive sputtering using an alloy target consisting of nitrided metal component while introducing nitrogen gas into Ar gas. After that, a polycarbonate resin sheet was adhered onto the second dielectric layer at the incident side using an ultraviolet curing resin to be a 0.1 mm thick covering layer to protect the recording layer. In this way, optical discs of embodiments A-C were obtained. Table 3 shows the conditions of reactive sputtering including thicknesses of the layers, the recording layer (thickness, composition, layered order).

TABLE 3

| | | Disc | | |
| --- | --- | --- | --- | --- |
| | | A | B | C |
| Reflecting layer | Thickness (nm) | 100 | 100 | 100 |
| 1st dielectric layer | Thickness (nm) | 15 | 10 | 10 |
| Recording layer | Thickness (nm) | 12 | 12 | 20 |
| | Composition | SnTiN | SnSiN | SnAlN |
| | Sputtering device | DC | RF | RF |
| | Deposition gas (flow:sccm) | Ar (40) + N$_2$ (50) | Ar (70) + N$_2$ (20) | Ar (50) + N$_2$ (40) |
| | Metal component ratio (atm) | Sn:Ti = 80:20 | Sn:Si = 80:20 | Sn:Al = 80:20 |
| 2nd dielectric layer | Thickness (nm) | 13 | 8 | 76 |

FURTHER COMPARATIVE EXAMPLES

Similarly to the above Comparative examples, optical discs of H and I were formed in the same manner as Example 1 except that the recording layer is formed only of alloy without nitrogen N$_2$. Table 4 the conditions of sputtering including thicknesses of the layers, the recording layer (thickness, composition, layered order).

TABLE 4

|  |  | Disc | |
| --- | --- | --- | --- |
|  |  | H | I |
| Reflecting layer | Thickness (nm) | 100 | 100 |
| 1st dielectric layer | Thickness (nm) | 10 | 10 |
| Recording layer | Thickness (nm) | 10 | 12 |
|  | Composition | SnSi | SnAl |
|  | Sputtering device | RF | RF |
|  | Deposition gas (flow:sccm) | Ar (90) | Ar(90) |
|  | Metal component ratio (atm) | Sn:Si = 80:20 | Sn:Al =80:20 |
| 2nd dielectric layer | Thickness (nm) | 60 | 50 |

A random pattern of 1-7 modulation was recorded on these Examples and Comparative using a multipath record at a linear velocity of 5.3 m/s with recording laser power of 5.3 mW and window width of 15.15 nsec, using an optical head having an objective lens with a numerical aperture (NA) of 0.85 and a light source at wavelength of 405 nm. Table 5 shows the results of measurements.

TABLE 5

| Disc | Recording power (mW) | Jitter (%) |
| --- | --- | --- |
| A | 7.8 | 8.3 |
| B | 8.6 | 9.2 |
| C | 8.9 | 11.9 |
| H | 7.5 | 15.5 |
| I | 5.6 | 18.2 |

Embodiments A-C exhibited satisfactory values of jitter were obtained in comparison with Comparative H, I.

Figure 10:
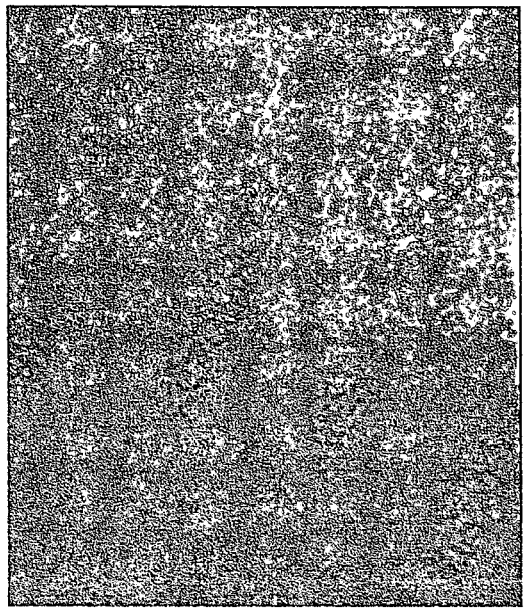
FIG. 10 is a photograph showing recorded marks formed on a BiN recording layer of information recording medium of embodiment according to the invention.
Figure 11:
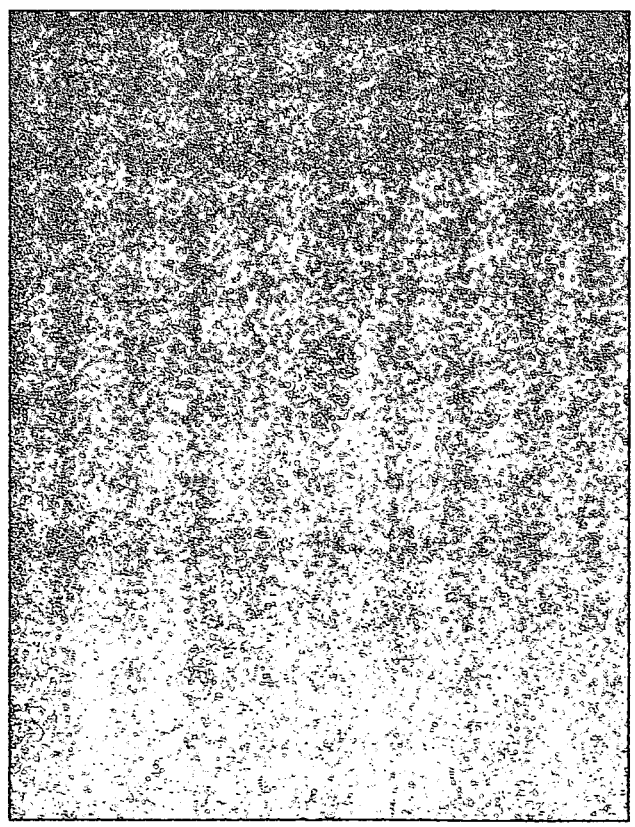
FIG. 11 is a photograph showing recorded marks formed on a SnTiN recording layer of information recording medium of embodiment according to the invention.
Figure 1:
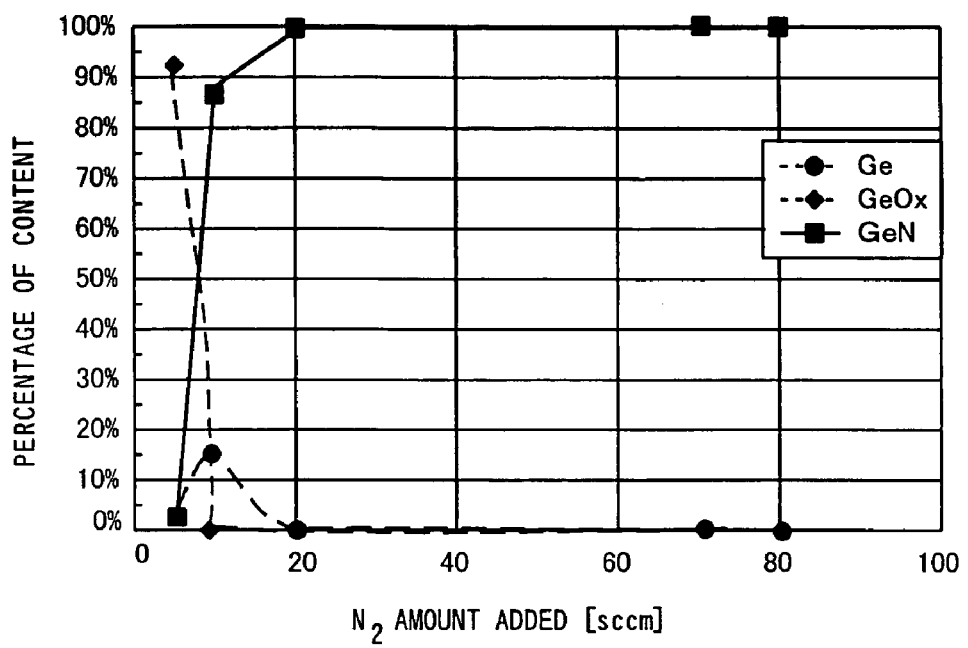
Figure 1:
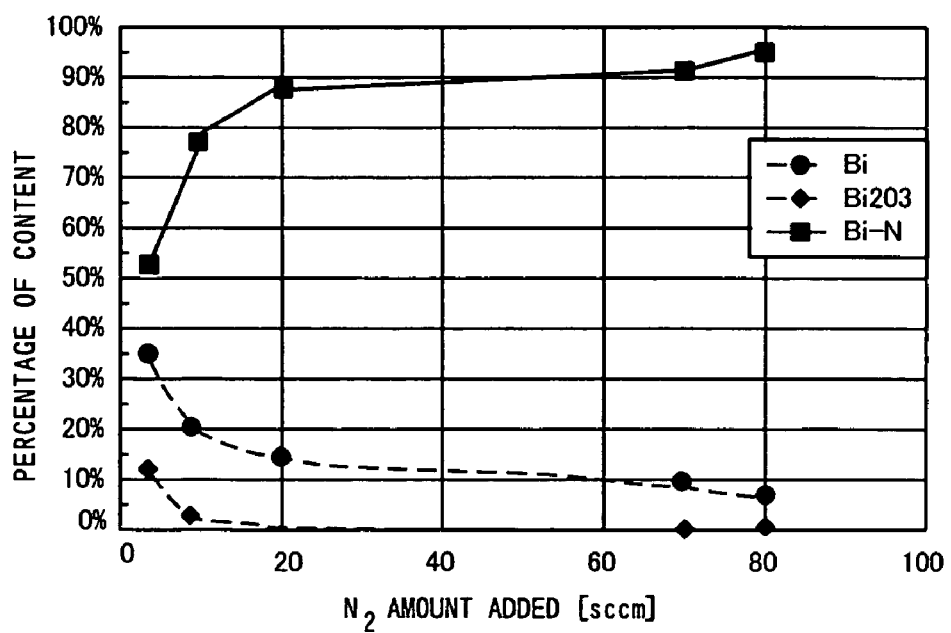

FIG. 10 shows recorded marks on the BiGeN recording layer (Embodiment 2) in a photograph of TEM (transmission electron microscope), and FIG. 11 shows recorded marks on the SnTiN recording layer (Optical disc A) in a photograph of TEM. As seen from both the photographs, there is evidence that the respective recorded marks are formed of sub-micron bubbles without spreading out the guide groove during the recording. In addition, an elevation difference between the non-recording portion and the recording portion in the thickness direction was at most approximately 6 nm with respect to the guide groove with 27 nm depth in observation with an atomic force microscope (not shown).

Ge, and Bi as well as a nitride and an oxide thereof on the BiGeN recording layer of sample optical discs were subjected to ESCA, and measurement results thereof are shown in Table 6. On the basis of Table 6, FIG. 12 shows variations in content percentage of the non-nitride (Ge and the oxide thereof) and Ge nitride with respect to the amount of nitrogen added, and FIG. 13 shows variations in content percentage of the non-nitride (Bi and the oxide thereof) and Bi nitride with respect to the amount of nitrogen added.

TABLE 6

| Added flow (sccm) | | Non-nitride | | | Nitride |
| --- | --- | --- | --- | --- | --- |
| N$_2$ gas | Ar gas | Ge | GeO$_x$ | Ge + GeO$_x$ | GeN |
| 5 | 85 | 4.30% | 92.50% | 97.80% | 3.20% |
| 10 | 80 | 15.00% | 0.00% | 15.00% | 85.00% |
| 20 | 70 | 0.00% | 0.00% | 0.00% | 100.00% |
| 70 | 20 | 0.00% | 0.00% | 0.00% | 100.00% |
| 80 | 10 | 0.00% | 0.00% | 0.00% | 100.00% |

| Added flow (sccm) | | Non-nitride | | | Nitride |
| --- | --- | --- | --- | --- | --- |
| N$_2$ gas | Ar gas | Bi | Bi$_2$O$_3$ | Bi + Bi$_2$O$_3$ | BiN |
| 5 | 85 | 34.70% | 12.10% | 46.80% | 53.30% |
| 10 | 80 | 20.50% | 2.80% | 23.30% | 76.70% |
| 20 | 70 | 13.80% | 0.00% | 13.80% | 86.20% |
| 70 | 20 | 8.40% | 0.00% | 8.40% | 91.60% |
| 80 | 10 | 5.60% | 0.00% | 5.60% | 94.40% |

The foregoing results show that a metal Ge remains when an introduced amount of nitrogen during deposition is 5 sccm. A material which is not nitrided exists including the metal Ge oxidized on the recording layer into Ge—O composition during the chemical analysis. The metal Ge is virtually non-existent when the introduced amount of nitrogen during deposition is 10 sccm, and only Ge—N composition is observed when the introduced amount of nitrogen is 20 sccm or more.

Specifically, it will be understood that 85% or more of GE in the recording film is nitrided when the amount of nitrogen introduced is 10 sccm or more. When a larger amount of nitrogen is introduced, a deposition rate drops, so that the amount of nitrogen introduced is effective if it is 10 to 80 sccm. Since the range where the recording layer is capable of providing sufficient absorption is preferred in terms of recording sensitivity, the amount of nitrogen to be introduced is desirably 10 to 60 sccm.

Sumilarly, FIG. 6 show that metal Bi remains when an introduced amount of nitrogen during deposition is 5 sccm. In a recording film, Bi exists in a mixture of metal Bi and Bi—N composition, and the percentage of nitride increases as the introduced amount of nitrogen increases during deposition.

When the introduced amount of nitrogen during deposition is 80 sccm, about 94% of Bi is nitrated. Therefore, it is preferable that 85% or more of Ge is nitrided and 94% or less of Bi is nitrided. Further, it is preferable that 85% of Ge is nitrided and 90% or less of Bi is nitrided in a case where the introduced amount of nitrogen during deposition is 60 sccm, which is required so as to enhance recording sensitivity.

Therefore, the metal component ratio in the recording layer is a wide range (the high temperature decomposable compound such as metal nitride range from 20 to 40 atm. %), which has a good characteristic. However, when the high temperature decomposable compound consists of nitride, it is necessary to adjust the nitrogen flow rate so that the film is perfectly nitrided during deposition.

When the flow rate ratio of the added nitrogen is increased, the non-nitrided component is reduced in the low temperature decomposable nitride to decrease the absorption rate of the recording layer. As a result, the sensitivity of the recording layer become inferior and the deposition rate of film is reduced to decrease productivity of the layer. Therefore, the quantity of the added nitrogen should be adjusted as possible in a bit for the benefit of productivity.

Figure 14:
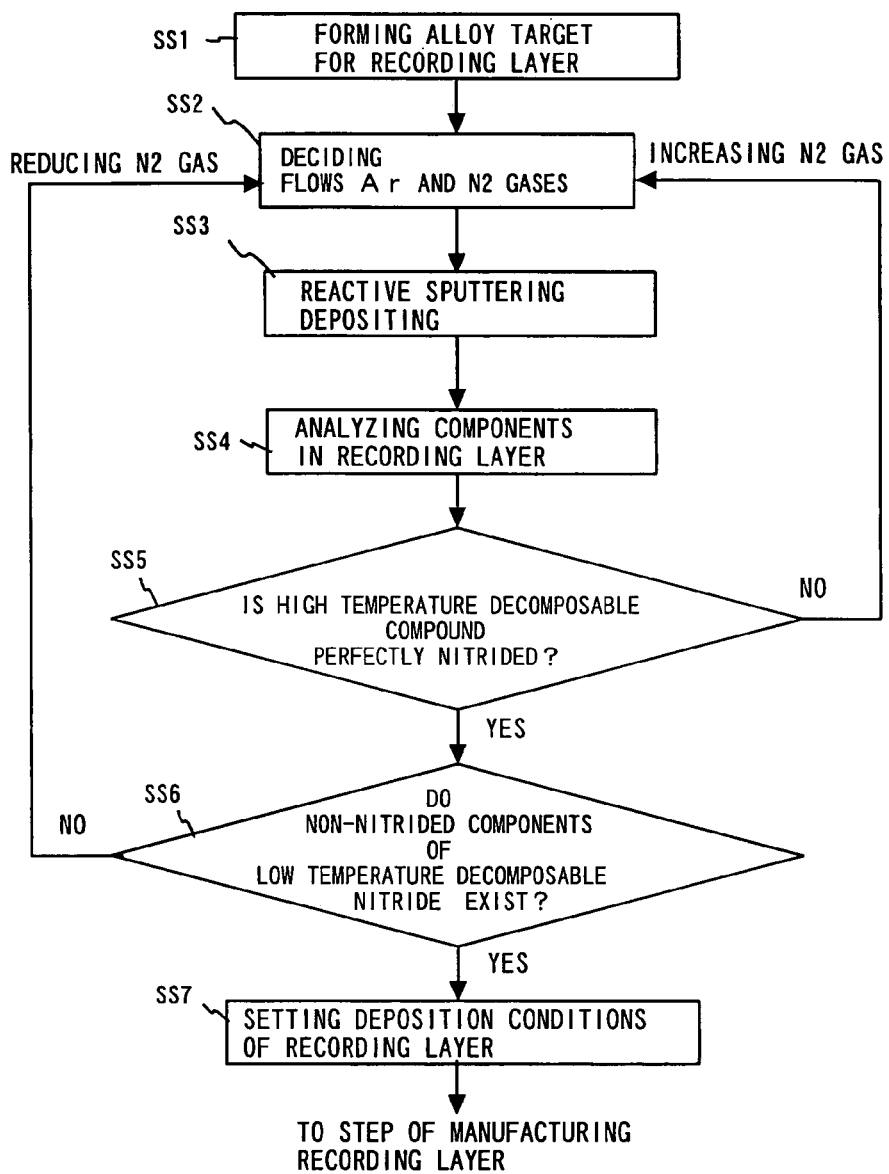
FIG. 14 is a flow chart showing a setting method for deciding conditions of film-formation to form a recording layer of the information recording medium according to the present invention.

FIG. 14 shows a setting method for determining conditions of the reactive sputtering deposition to form a recording layer in which the high temperature decomposable compound of the recording layer consists of metal nitride. First, there is formed a sputtering target consisting of alloy including metal components to be included in such metal nitride, or of oxide thereof or of nitride thereof. For example, an alloy target is provided in a chamber of the sputtering device (SS1). Next, flow rates of Ar gas and nitrogen gas are decided on the basis of predetermined initial values as sputtering introducing gases (SS2). Next, the reactive sputtering deposition is preformed (SS3). Next, the deposited recording layer is analyzed in component (SS4). Next, the judgment whether or not the high temperature decomposable compound is perfectly nitrided is performed (SS5). Here, if the high temperature decomposable compound is not perfectly nitrided then back to the flow rate decision step (SS2) to increase the flow rate of nitrogen gas for a prefect nitrization. Whereas, if the high temperature decomposable compound is not perfectly nitrided then the judgment whether or not the non-nitrided component of the low temperature decomposable nitride exists in the layer is performed (SS6). Here, if the non-nitrided component of the low temperature decomposable nitride is insufficient then back to the flow rate decision step (SS2) to decrease the flow rate of nitrogen gas to ensure the non-nitrided component in the recording layer. Whereas, if the non-nitrided component is sufficient in the recording layer then there is determined the flow rate of nitrogen gas as it is (SS7) and thus the setting of deposition conditions of the recording layer is completed. The determined flow rate of nitrogen gas goes forward to the step of manufacturing the recording layer. Further, the foregoing setting method of deposition conditions may be used in case that materials other than metal nitride are used for the recording layer.

Figure 15:
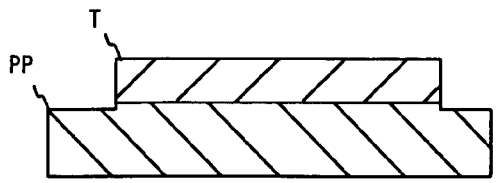
FIG. 15 is a partial cross sectional view schematically illustrating a target for sputtering to form a recording layer of the information recording medium according to the present invention.

FIG. 15 shows a cross section view of a target for sputtering having a disc-shape body T fixed on a packing plate PP to deposit the recording layer. The target may be formed of a homogenized alloy or nitride or oxide. Alternatively, the target may be formed of a plurality of simple substance pieces in mosaic in view of the sputtering yeild.

According to the invention, the thermal decomposition may be controlled by the mixture layer i.e., recording layer consisting of the metal nitride easily decomposed due to a recording laser power of irradiated light (low temperature decomposable nitride) and the metal compound hardly decomposed (high temperature decomposable compound). Therefore, such a layer construction provides the minute marks with excellent shapes after recording as shown in FIGS. 10 and 11 with minimum deformation. Mainly, information recording is achieved with changes of the optical characteristic in the recording layer after the thermal decomposition. Thus there is obtained the recording layer having a considerable difference in reflectance before and after recording and a high S/N ratio and an excellent jitter characteristic.

In addition, the mixed recording layer can be formed at once in the reactive sputtering deposition with added nitrogen while adjusting target contents.

Further, the components of the recording layer may be selected from inorganic materials, which is not designated as poisonous substances under the environmental criteria.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

The invention claimed is:

1. An information recording medium comprising a recording layer which includes a material having a reflectance which varies by irradiation of a light beam, on which information is recorded as reflectance variations, and a substrate for supporting the recording layer,
   wherein said recording layer consists essentially of an inorganic mixture of both
      a low temperature decomposable metal nitride capable of being decomposed at a temperature ranging from 100° C. to 600° C. and
      a high temperature decomposable metal compound, as a main component, includes a metal nitride which is capable of being decomposed at a temperature higher than 600° C.,
   wherein said low temperature decomposable metal nitride is a nitride including at least of Bi, or Sn.

2. An information recording medium according to claim 1, wherein said low temperature decomposable metal nitride is decomposed at said temperature ranging from 100° C. to 600° C. to generate nitrogen but nitrided insufficiently.

3. An information recording medium according to claim 1, wherein said recording layer is formed by a reactive sputtering process with a nitrogen atmosphere using a target for sputtering while introducing nitrogen into a sputtering atmosphere and adjusting nitrogen in such a manner that said low temperature decomposable metal nitride of said recording layer includes a non-nitrided component, wherein said target is made from at least one of an alloy, an oxide and a nitride each of which includes at least one metal component in said recording layer.

4. An information recording medium according to claim 1, wherein said recording layer is formed by a sputtering process using a target for sputtering in such a manner that said recording layer includes a non-nitrided component, wherein said target is made from a nitride includes a metal component in said recording layer.

5. An information recording medium according to claim 2, wherein, in said high temperature decomposable compound, the metal nitride which is capable of being decomposed at a temperature higher than 600° C. is a nitride including at least of Ge, Ti, Si, or Al.

6. An information recording medium according to claim 1, wherein said low temperature decomposable metal nitride is Bi and wherein the metal nitride which is capable of being decomposed at a temperature higher than 600° C. is Ge, and the Ge is nitrided by 85% or more.

7. An information recording medium according to claim 6, wherein the Bi is nitrided by 90% or less.

8. An information recording medium according to claim 6, wherein the Bi is nitrided by 94% or less.

9. An information recording medium according to claim 1, wherein said high temperature decomposable metal compound contains a nitride including at least one material selected from Mg, Ca, Sr, Sc, Y, Zr, Hf, V, Nb, Tc, Ru, Rh, W, Re, Os, Ir, Pt, Au Ta and Ga.

10. An information recording medium according to claim 1, wherein said high temperature decomposable metal compound contains a nitride including at least one material selected from Tl, Te In and Zn.

11. An information recording medium according to claim 1, further comprising a protective layer for protecting said recording layer.

12. An information recording medium according to claim 1, further comprising a reflecting layer on a side opposite to the one where said light beam is irradiated.

13. An information recording medium according to claim 1, wherein said light beam has a wavelength of 385 to 450 nm.

14. An information recording medium according to claim 1, wherein said recording layer includes an oxide including at least one metal component in said low temperature decomposable metal nitride or said high temperature decomposable metal compound.

\* \* \* \* \*